United States Patent
Craft

[11] Patent Number: 5,161,904
[45] Date of Patent: Nov. 10, 1992

[54] TRANSMISSION COUNTERSHAFT ROTARY BEARING SHIM

[75] Inventor: Robert B. Craft, Battle Creek, Mich.

[73] Assignee: Eaton Corporation, Cleveland, Ohio

[21] Appl. No.: 731,167

[22] Filed: Jul. 10, 1991

[51] Int. Cl.⁵ ............................................. F16C 23/06
[52] U.S. Cl. ................................. 384/583; 384/519; 384/626
[58] Field of Search ............... 384/571, 562, 563, 583, 384/626, 519, 517

[56] References Cited

U.S. PATENT DOCUMENTS

| | | | |
|---|---|---|---|
| 1,337,882 | 4/1920 | Bott | 384/519 X |
| 1,631,557 | 6/1927 | Sponable | 384/583 |
| 1,774,160 | 8/1930 | Sweet | 384/583 |
| 3,069,928 | 12/1962 | Cote et al. | 384/583 X |
| 4,027,756 | 6/1977 | Wolfe | 192/53 E |
| 4,033,644 | 7/1977 | Reneerkens | 384/563 |
| 4,104,928 | 8/1978 | Vandevoort | 74/331 |
| 4,229,017 | 10/1980 | Hagedorn | 384/396 X |
| 4,917,511 | 4/1990 | Katsube | 384/519 X |

Primary Examiner—Thomas R. Hannon
Attorney, Agent, or Firm—A. E. Chrow

[57] ABSTRACT

A motor vehicle countershaft type transmission (100) is provided in which a rotary shim member (200) is employed to rotationally advance through a threaded opening (39) in an external cover plate (38) to engage and minimize end-play of the countershaft to the extent desired and then be releasably locked at the selected rotational position by a retainer (40) having one end that engages a depression (30) in the exposed end of shim member (200) and an opposite end that is releasably secured to cover plate (38).

14 Claims, 2 Drawing Sheets

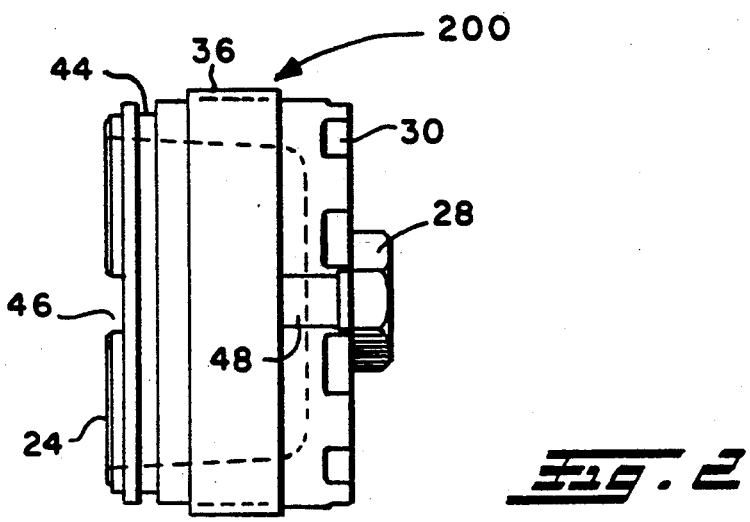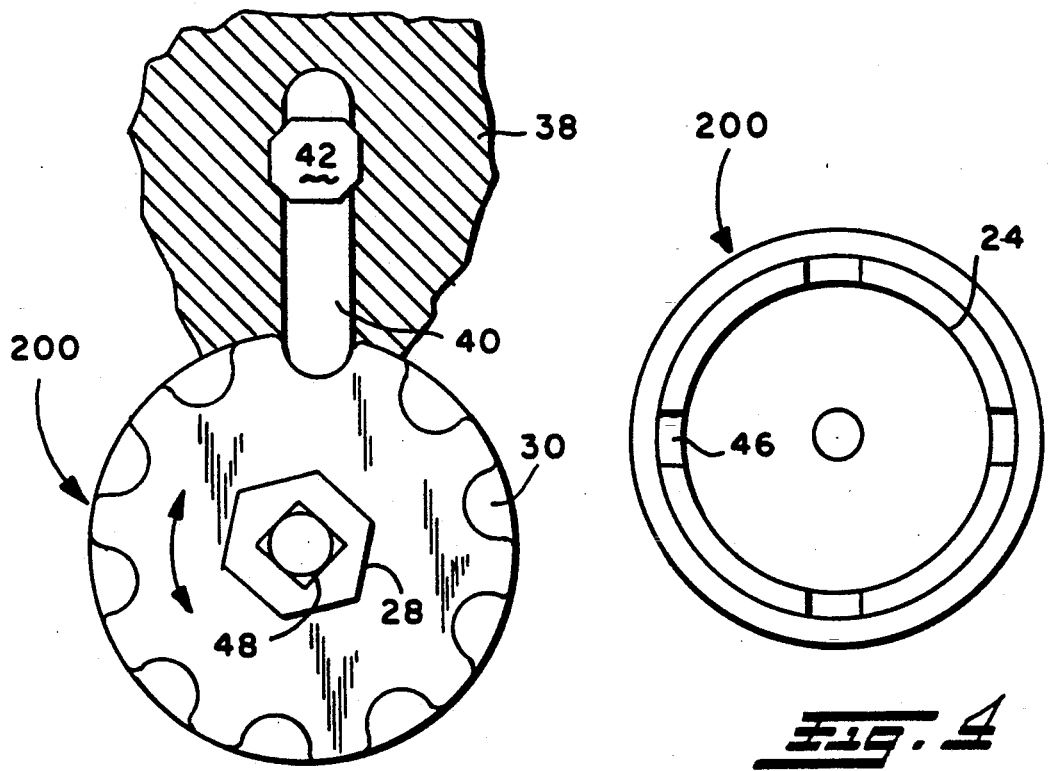

TRANSMISSION COUNTERSHAFT ROTARY BEARING SHIM

INTRODUCTION

This invention relates generally to a shim for adjusting end play of a motor vehicle change gear transmission countershaft bearing assembly and more particularly to an improved rotary shim member that is able to be rotationally advanced against the bearing to minimize end play to the extent desired and then be releasably locked to hold the shim at the selected rotational position.

BACKGROUND OF THE INVENTION

The use of one or more countershafts in heavy duty motor vehicle change gear transmissions to increase gear ratio availability is well known in the art and of which examples may be seen in U.S. Pat. Nos. 4,027,756 and 4,104,928, the disclosures of which are included herein by reference. Such countershafts carry gears that are driven and selectively drive the mainshaft gears. Such countershafts are rotationally supported on the transmission housing by bearing assemblies (commonly tapered roller bearing assemblies) with the inner race of the bearing being commonly press-fit onto the countershaft adjacent its opposite ends with the outer race being disposed and axially movable along a bore in the transmission housing.

Since it is essential to keep axial movement of the shaft to a minimum to prevent bearing and/or gear tooth wear and breakage, varying thickness shim discs having commonly been employed in the past to fill the gap in the housing bore between the outer race and an external cover plate covering the bore opening to control end play of the bearing assembly and of the shaft itself.

The use of such shim discs requires costly inventory of discs having varying thicknesses and even then one may not be able to effect the closeness of fit desired in addition to the fact that the shim discs cannot be adjusted for wear without the costly and time consuming task of having to remove the cover plate.

The present invention replaces such shim discs with a rotary shim member that can be rotationally advanced against the bearing assembly to minimize end play to the extent desired and then be releasably locked at that rotational position until readjustment is required at which time the rotary shim is released and rotationally advanced to a new rotational position and then again releasably locked at the new position.

The use of the threaded members to control end play of bearing assemblies is known and can be found for example in U.S. Pat. No. 4,229,017, the disclosure of which is included herein by reference and in which a threaded bolt optionally having a lock nut is used to prevent axial movement of a bearing assembly on a vehicle suspension king pin. Another example can be found in U.S. Pat. No. 4,033,644, the disclosure of which is included herein by reference, where a threaded device is used to compress Belville washers against a bearing assembly on a motor vehicle axle. Such devices however fail to include the rotational position locking member as an integral part of a rotary shim member and no one prior to the present invention recognized the great advantage in providing a threaded opening through the countershaft cover plate so as to enable the use of a threaded rotary shim member to minimize end play of the shaft bearing assembly to the extent desired without having to remove the cover plate.

BRIEF DESCRIPTION OF THE DRAWINGS

FIG. 2 is a side elevation of a rotary shim member 200 used to control end play of a bearing assembly rotationally supporting shaft 6 of FIG. 1;

FIG. 3 is a right side view of rotary shim member 200 of FIGS. 1 and 2 taken along view line 3—3 in FIG. 1; and FIG. 4 is a left side view of rotary shim member of FIG. 2.

DESCRIPTION OF SOME PREFERRED EMBODIMENTS

Figure 1:
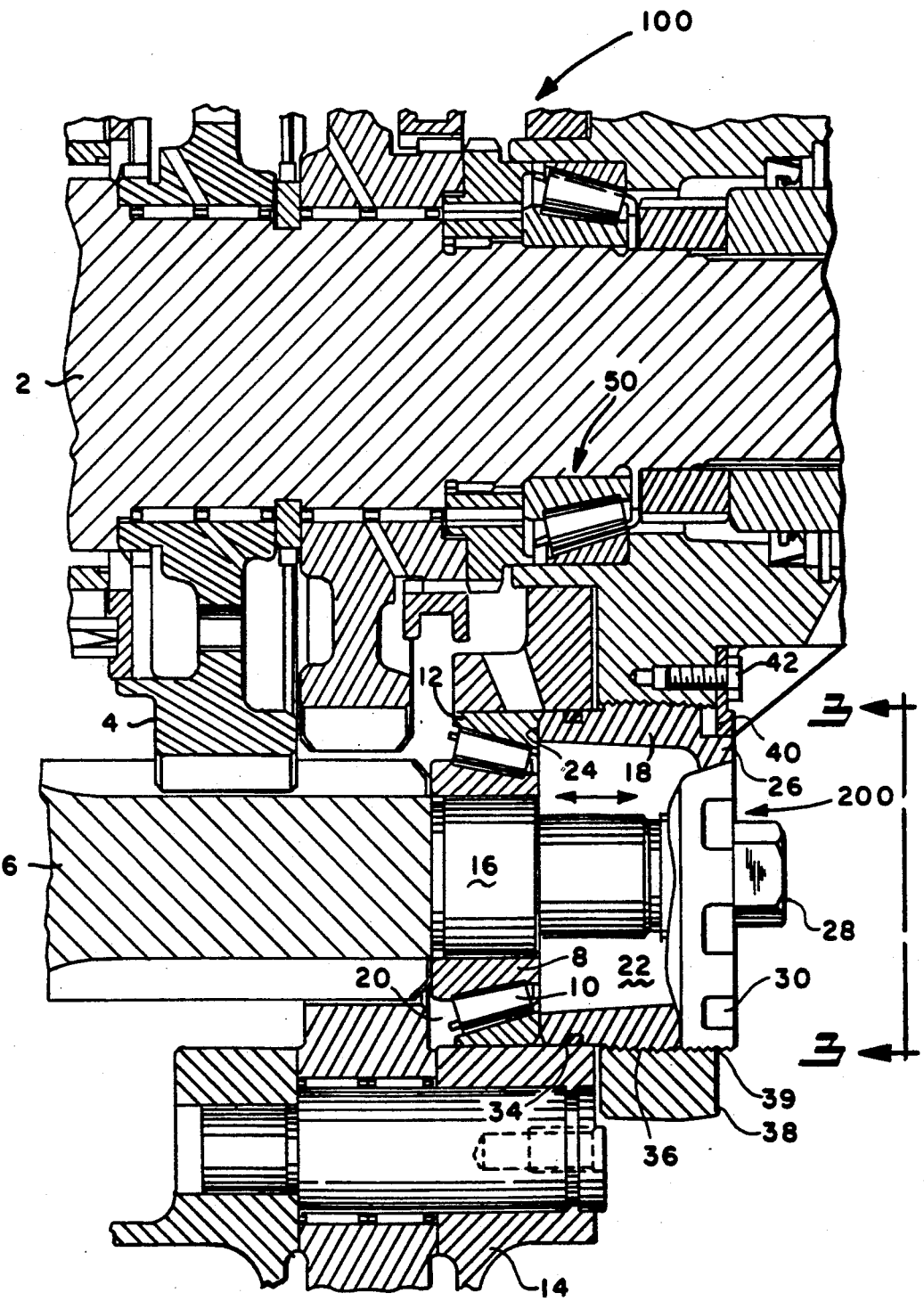
FIG. 1 is a partial central cross-sectional view of a motor vehicle change gear transmission 100 having a countershaft 6.

Change gear transmission 100 of FIG. 1 has a mainshaft 2 journaled for rotation on transmission housing 14 by means of bearing assembly 50 which commonly is a tapered roller bearing assembly due to both radial and axial thrust forces imparted upon shaft 2 during operation of the transmission. Mainshaft 2 is rotated by the vehicle engine while the engine is coupled thereto by a suitable clutch mechanism.

Mainshaft 2 carries change gears such as gear 4 that drive or are rotationally driven, as the case may be, by change gears carried by countershaft 6 that is journaled for rotation on housing 14 in substantial parallel relationship to mainshaft 2 as shown in FIG. 1.

The bearing assembly rotationally supporting countershaft 6 has an inner race 8 that characteristically is press-fit onto a shoulder such as shoulder 16 of shaft 6. The bearing assembly has a plurality of tapered rollers 10 that roll about the inner surface of outer race 12 that is disposed within and axially movable along bore 20 of housing 14. Heretofore, the external open end of bore 20 has been covered with a cover plate after having placed shim discs about shaft 6 to fill the gap between outer race 12 and the cover plate to minimize end play of shaft 6 and the bearing assembly as previously described.

In accordance with the present invention, a rotary shim member 200 is used to control end play of the bearing assembly supporting shaft 6. Rotary shim member 200 is received into bore 20 through a threaded opening 39 through external cover plate 38 that is secured to housing 14 by suitable fasteners.

Rotary shim member 200 has a substantially cylindrical wall 18 about which an external threaded section 36 is disposed between a first end having an annular surface 24 adapted to engage outer race 12 and a second end having means such as a hexagonal nut head 28 enabling a conventional tool such as a wrench to be used to rotate rotary shim member 200 within bore 20. The second end of shim member 200 also has means for enabling the shim member to be releasably locked at a selected rotational position of which a preferred embodiment is provided by having at least one depression 30 in the second end that cooperates with a retainer 40 to secure member 200 in a desired rotational position as hereinafter described with respect to FIG. 3.

Although shown as a male nut head 28, other means may be employed that enable one to use a tool to rotate shim member 200 such as having a female depression in the second end for engagement with an Allen wrench or the like.

Rotary shim members made in accordance with the present invention preferably include a resiliant lubricant sealing member such as an elastomeric "O"-ring 34 shown in FIG. 1 that is preferably contained in annular groove 44 in the outer surface of wall 18 between the first end and threaded section 36 of shim member 200 shown in FIG. 2. "O"-ring 34 is adapted to compress against the wall of housing 14 surrounding bore 20 to prevent leakage of lubricant such as transmission oil contained within housing 14 to lubricate bearings and gears and the like.

Rotary shim members made in accordance with the invention preferably further include a passageway or access through the second end to enable insertion of a dial indicator or the like that contacts the end of the countershaft to provide a numerical indication of end play as the countershaft is moved back and forth or to enable transfer of lubricant into cavity 22 of shim member 200 surrounded by wall 18 in which case the passageway is preferably threaded to receive a lubricant fitting such as a zirk fitting commonly used to transfer grease and the like under pressure to lubricate the countershaft bearing assembly.

As can be seen in FIG. 1, rollers 10 of the bearing assembly are positioned at the entrance way into cavity 22 and thus are exposed to transmission oil contained within housing 14. Preferably, the passageway through the second end passes through the center of the means such as nut head 28 for rotating shim member 200 such as threaded passageway 48 shown in FIG. 3.

Thus, as shim member 200 is rotationally advanced through threaded opening 39 in cover plate 38, the end of shaft 6 progressively enters cavity 22 as annular surface 24 moves axially towards the viewer's left and utlimately engages outer race 12 as shown by the arrows in FIG. 1 and urges it towards the viewer's left in the amount deemed necessary to minimize end play of shaft 6 and the bearing assembly rotationally supporting shaft 6.

As shown in FIG. 2, annular surface 24 of rotary shim member 200 may further include at least one and preferably a plurality of a circumferentially equi-spaced array of radially extending slots 46 therein as shown in FIG. 4 that allow transmission oil within housing 14 to drain into cavity 22 from the back side of bearing 10. Slots such as slots 46 can be effective in reducing the circumferential length of annular surface 24 actually engaging outer race 12.

A preferred embodiment of the means by which one is able to releasably lock rotary shim member 200 in a desired rotational position is best illustrated in FIG. 3 where the second end of shim member 200 includes at least one and preferably a plurality of depressions 30 disposed in a substantially circular array and spaced substantially equidistant from each other. Depressions 30 are adapted to receive an end of retaining member 40 therein having an opposite end that is secured to cover plate 38 by means of a suitable fastener such as bolt 42 of which both have been previously described with respect to FIG. 1.

In operation, retaining member 40 is absent or at least clear of depressions 30 while rotary shim member 200 is rotationally advanced axially through opening 39 through cover plate 38 until annular surface 24 engages and presses against outer race 6 in the amount deemed necessary to minimize end-play to the extent desired at which axial position rotational position retainer 40 is inserted into the depression 30 in registration with the location at which the opposite end of retaining member 40 is then secured to cover plate 38 to releasably lock rotary shim member 200 at the rotational position selected.

In practice, rotary shim member 200 is preferably backed off a quarter turn from its most axial advanced position to provide desired end play.

What is claimed is:

1. An improved vehicular change gear transmission having a countershaft having an end journaled for rotation by a bearing assembly having an outer race axially movable along a transmission housing bore, the improvement characterized by said bore covered by an end plate secured to the housing and having a threaded opening therethrough in substantial coaxial alignment with the housing bore and operative to threadingly receive a rotary shim member therethrough that upon rotation is adapted to advance and engage the outer race and position the bearing assembly axially along the bore in a manner effective to minimize end play of the bearing assembly to the extent desired, said shim member having;

a substantially cylindrical wall having a threaded section disposed on the outer surface thereof between a first end and a second end thereof and adapted to threadingly engage the cover plate opening threads, said first end having an annual surface adapted to engage the bearing assembly outer race and surrounding an entrance way into a cavity within the rotary shim member operative to progressively receive an end of the countershaft thereinto upon rotational advancement of the annular surface towards the bearing assembly outer race and having at least one radially extending slot therein operative to enable transmission fluid within the transmission housing to drain into the shim member cavity, and said second end having means for enabling rotation of the rotary shim member by a tool and further having rotational position locking means for releasably locking the shim member in a selected rotational position.

2. The transmission of claim 1 wherein rotary shim member further includes resilient sealing means for sealing lubricant within the transmission housing.

3. The transmission of claim 1 wherein rotary shim member includes an annular groove in the outer surface thereof between the first end and the threaded section and a resilient "O"-ring is disposed in the groove.

4. The transmission of claim 1 wherein rotary shim member second end includes a passageway operative to provide access into the cavity.

5. The transmission of claim 1 wherein rotary position locking means comprises at least one depression in the rotary shim member second end adapted to receive an end of a retaining member therein having an opposite end securable to the cover plate.

6. The transmission of claim 5 wherein rotary shim member has a plurality of the depressions disposed substantially circumferentially equidistant from each other in a substantially circular array.

7. The transmission of claim 1 wherein the means for enabling rotation of the rotary shim member includes a passageway operative to enable lubricant transfer into the cavity therethrough.

8. A shim assembly for controlling end play of a bearing assembly rotationally supporting an end of a vehicular transmission countershaft in a transmission housing bore, said bearing assembly having an outer race axially movable along the housing bore, and said shim assembly comprising;
- a cover plate secured to the housing and having a threaded opening therethrough in substantial coaxial alignment with the housing bore,
- a rotary shim member having a substantially cylindrical wall having a threaded section on the outer surface disposed between a first end and a second end thereof and adapted to threadingly engage the cover plate opening threads,
- said first end having an annular surface adapted to engage the bearing assembly outer race and surrounding an entrance way into a cavity within the rotary shim member operative to progressively receive the end of the countershaft thereinto upon rotational advancement of the annular surface towards the bearing assembly outer race and having at least one radially extending slot therein operative to enable transmission fluid within the transmission housing to drain into the shim member cavity, and
- said second end having means for enabling rotation of the rotary shim member by a tool and rotational position locking means for releasably locking the rotary shim member in a selected rotational position.

9. The shim assembly of claim 8 wherein the rotary shim member further includes resilient sealing means for sealing lubricant with the housing.

10. The shim assembly of claim 9 wherein the rotary shim member includes an annular groove in the outer surface thereof between the threaded section and the first end and the resilient sealing means is a resilient "O"-ring disposed in the groove.

11. The shim assembly of claim 8 wherein the rotary shim member second end includes a passageway operative to provide access into the cavity.

12. The shim assembly of claim 8 wherein the rotary position locking means comprises at least one depression in the rotary shim member second end adapted to receive an end of a retaining member therein having an opposite end securable to the cover plate.

13. The shim assembly of claim 12 wherein the rotary shim member has a plurality of the depressions disposed substantially circumferentially equidistant from each other in a substantially circular array.

14. The shim assembly of claim 8 wherein the means for enabling rotation of the rotary shim member includes a passageway operative to enable access into the cavity.

* * * * *